(12) United States Patent
Zheng (10) Patent No.: US 11,223,856 B2
(45) Date of Patent: Jan. 11, 2022

(54) METHOD FOR PROCESSING STREAMING MEDIA DATA AND SERVER FOR PROCESSING STREAMING MEDIA

(71) Applicant: Wangsu Science & Technology Co., Ltd., Shanghai (CN)

(72) Inventor: Zhengui Zheng, Shanghai (CN)

(73) Assignee: Wangsu Science & Technology Co., Ltd., Shanghai (CN)

( * ) Notice: Subject to any disclaimer, the term of this patent is extended or adjusted under 35 U.S.C. 154(b) by 148 days.

(21) Appl. No.: 16/717,608

(22) Filed: Dec. 17, 2019

(65) Prior Publication Data
US 2020/0396492 A1 Dec. 17, 2020

Related U.S. Application Data

(63) Continuation of application No. PCT/CN2019/096178, filed on Jul. 16, 2019.

(51) Int. Cl.
*H04N 21/2343* (2011.01)
*H04N 21/84* (2011.01)
(Continued)

(52) U.S. Cl.
CPC ..... *H04N 21/2343* (2013.01); *H04N 21/2187* (2013.01); *H04N 21/643* (2013.01); *H04N 21/84* (2013.01); *H04N 21/8456* (2013.01)

(58) Field of Classification Search
CPC ............... H04N 21/2343; H04N 21/84; H04N 21/2187; H04N 21/643; H04N 21/8456
See application file for complete search history.

(56) References Cited

U.S. PATENT DOCUMENTS 10,114,689 B1 * 10/2018 Yang .................... G06F 11/0793
10,313,412 B1    6/2019 Hall et al.
(Continued)

FOREIGN PATENT DOCUMENTS

CN    104041061 A    9/2014
CN    105897672 A    8/2016
(Continued)

OTHER PUBLICATIONS

Wangsu, Science & Technology, Co., Ltd., Office Action, CN 201910499096.3, dated Feb. 3, 2020, 11 pgs.
(Continued)

*Primary Examiner* — Anthony Bantamoi
(74) *Attorney, Agent, or Firm* — USCH Law, PC (57) ABSTRACT

The present disclosure discloses a method for processing streaming media data and a server for processing streaming media. The method includes: acquiring an index file of a streaming media data, where the streaming media data is segmented into a plurality of segment files; determining a target segment file to be replaced in the plurality of segment files in accordance with the index file and an information for replacing data; and converting a preset replacing streaming media data into a replacing segment file matched with the target segment file, and replacing the target segment file in the streaming media data with the replacing segment file to obtain the streaming media data of which the content is replaced. The technical solutions in the present disclosure can save an overhead of a streaming media server and a streaming media player, and improve an efficiency of replacing content.

18 Claims, 6 Drawing Sheets

(51) Int. Cl.
      *H04N 21/2187*    (2011.01)
      *H04N 21/643*     (2011.01)
      *H04N 21/845*     (2011.01)

(56) References Cited

U.S. PATENT DOCUMENTS

| | | |
|---|---|---|
| 2012/0137015 A1 | 5/2012 | Sun |
| 2014/0304373 A1 | 10/2014 | Tarbox et al. |
| 2015/0201227 A1 | 7/2015 | Krasko et al. |
| 2015/0302487 A1* | 10/2015 | Reynolds ............ G06Q 30/0277 |
| 2016/0323643 A1 | 11/2016 | Panchaksharaiah et al. |
| 2017/0147830 A1* | 5/2017 | Park .................... G06F 21/6218 |
| 2018/0192158 A1* | 7/2018 | Smith .................. H04N 21/812 |

FOREIGN PATENT DOCUMENTS

| | | |
|---|---|---|
| CN | 105959746 A | 9/2016 |
| CN | 106210809 A | 12/2016 |
| CN | 107580256 A | 1/2018 |
| CN | 109040827 A | 12/2018 |
| CN | 109155864 A | 1/2019 |
| WO | WO 2017/192132 A1 | 11/2017 |

OTHER PUBLICATIONS

Wangsu Science & Technology Co., Ltd., Final Office Action (CN), CN201910499096.3, dated Sep. 27, 2020, 5 pgs.

Wangsu Science & Technology Co., Ltd., Extended European Search Report, EP19805507.1, dated Jul. 17, 2020, 10 pgs.

\* cited by examiner

METHOD FOR PROCESSING STREAMING MEDIA DATA AND SERVER FOR PROCESSING STREAMING MEDIA

CROSS REFERENCE TO RELATED APPLICATIONS

The present application is a continuation of PCT Patent application No. PCT/CN2019/096178, entitled "Method for Processing Streaming Media Data and Server for Processing Streaming Media" filed on Jul. 16, 2019, which claims priority to Chinese patent application No. 201910499096.3, filed Jun. 11, 2019, all of which are hereby incorporated by reference in their entirety.

TECHNICAL FIELD

The present disclosure relates to the Internet technology, and in particular, to a method for processing streaming media data and a server for processing streaming media.

BACKGROUND

An HTTP Live Streaming (HLS) protocol is widely applied to current streaming media services, such as on-demand service and live broadcast service. In accordance with the HLS protocol, a streaming media server can segment an audio and video content into a plurality of segment files according to a certain duration which the segment files occupy, and the segment files can adopt a transport stream (ts) format. In addition, an index file of the above segment files can be established in the streaming media server, and the index file is usually in a format of m3u8. When a streaming media player plays streaming media resources using the HLS protocol, the m3u8 index file of the streaming media resource can be downloaded from the streaming media server firstly, and then a corresponding ts file can be downloaded and played sequentially in accordance with the segment information in the index file.

With a continuous enrichment of streaming media resources in the network, an audition of streaming media resources by major websites is becoming more and more standardized. At present, if there is an illegal content in the streaming media resources, modified streaming media resources are needed to be uploaded for re-audition. In practical applications, sometimes only a small part of the streaming media resources are needed to be modified, but the whole streaming media resources in the streaming media server are still needed to be replaced. Specifically, for a streaming media server, steps of segmenting and establishing index files for re-uploaded streaming media resources are required. In addition, for a streaming media player, the original streaming media resources cannot be used, thus the streaming media player needs to re-download the index files to play the modified streaming media resources normally. This will undoubtedly increase an overhead of the streaming media server and the streaming media player, and in addition, result in a low efficiency of replacing the streaming media resources.

SUMMARY

An objective of the present disclosure is to provide a method for processing streaming media data and a server for processing streaming media, which can save an overhead of the streaming media server and the streaming media player and improve an efficiency of replacing content.

In order to achieve the above objective, the present disclosure provides a method for processing streaming media data, which includes: acquiring an index file of a streaming media data, where the streaming media data is segmented into a plurality of segment files; determining a target segment file to be replaced in the plurality of segment files in accordance with the index file and information for replacing data; and converting a preset replacing streaming media data into a replacing segment file matched with the target segment file, and replacing the target segment file in the streaming media data with the replacing segment file to obtain the streaming media data of which a content is replaced.

In order to achieve the above objective, the present disclosure further provides a server for processing streaming media, which includes: a unit for acquiring an index file, configured to acquire an index file of a streaming media data, where the streaming media data is segmented into a plurality of segment files; a unit for determining a target segment file, configured to determine a target segment file to be replaced in the plurality of segment files in accordance with the index file and information for replacing data; and a unit for replacing content, configured to convert a preset replacing streaming media data into a replacing segment file matched with the target segment file, and replacing the target segment file in the streaming media data with the replacing segment file to obtain the streaming media data of which a content is replaced.

In order to achieve the above objective, the present disclosure further provides a server for processing streaming media, which includes a processor and a memory, where the memory is configured to store a computer program, and the computer program is executed by the processor to implement the above method for processing streaming media data.

From the above technical solution in the present disclosure may complete a process of replacing the content of the streaming media data via the server for processing streaming media. Specifically, the server for processing streaming media may acquire the index file of the streaming media data of which the content is needed to be replaced. Then, in accordance with information for replacing data and the index file, the target segment file to be replaced may be determined in the plurality of segment files obtained by segmenting the streaming media data. For these (or this) target segment files, the corresponding replacing streaming media data may be provided. The server for processing streaming media may read the replacing streaming media data, then convert the replacing streaming media data into a replacing segment file matched with the target segment file, and replace the target segment file in the streaming media data with the replacing segment file, thereby obtaining the streaming media data of which the content is replaced. From the above, when the content of the streaming media data is replaced, not all the content of the entire streaming media data is needed to be replaced, but a part of the target segment file that is needed to be replaced in the streaming media data is determined, and then the part of the target segment file is replaced with a matching replacing segment file. In this way, in the streaming media server, the steps of re-segmenting the streaming media data and establishing index files of the streaming media data are not needed to be executed. Further, the segment file in the streaming media data is only replaced in the technical solution of the present disclosure, thereby not changing the index file of the streaming media data. In this way, the streaming media player may normally play the streaming media data of which the content is replaced using the original index file without re-downloading the index file.

Therefore, the method for processing streaming media data and the server for processing streaming media in the present disclosure can save the overhead of the streaming media server and the streaming media player, and improve the efficiency of replacing the content.

BRIEF DESCRIPTION OF THE DRAWINGS

In order to describe technical solutions in embodiments of the present disclosure more clearly, drawings used to describe the embodiments will be briefly introduced below. Obviously, the drawings described below are only some embodiments of the present disclosure. For those skilled in the art, further drawings may be obtained in accordance with these drawings without creative work.

DETAILED DESCRIPTION

In order to make objectives, technical solutions and advantages of the present disclosure clearer, embodiments of the present disclosure are explained below in detail with reference to accompanying drawings.

Figure 1:
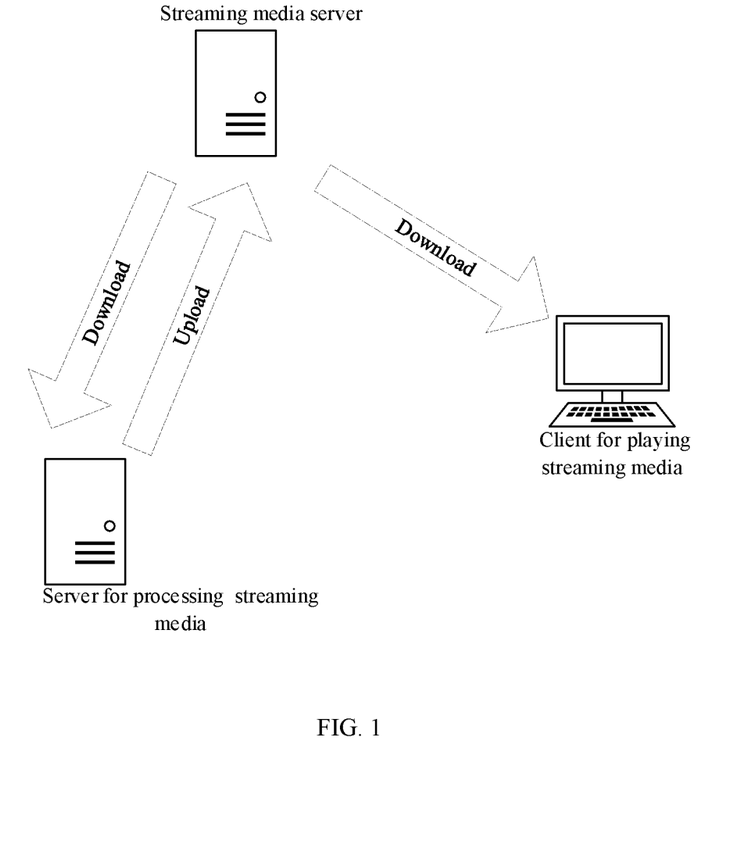
FIG. 1 is a schematic structural diagram of a system in which a server for processing streaming media is located in an embodiment of the present disclosure.

The present disclosure provides a method for processing streaming media data, and an execution subject of the method may be a server for processing streaming media. With reference to FIG. 1, the server for processing streaming media may be in a system architecture shown in FIG. 1. The system may include the server for processing streaming media, a streaming media server and a client for playing streaming media. Here, the streaming media server may store various streaming media data, and the streaming media data may, for example, be various audio and video files. The server for processing streaming media may obtain an access to the streaming media server, and may obtain the streaming media data from the streaming media server and upload the streaming media data to the streaming media server. The client for playing streaming media may be a terminal device used by a user. The client for playing streaming media may download an index file from the streaming media server and play a corresponding streaming media data in accordance with the index file.

Figure 2:
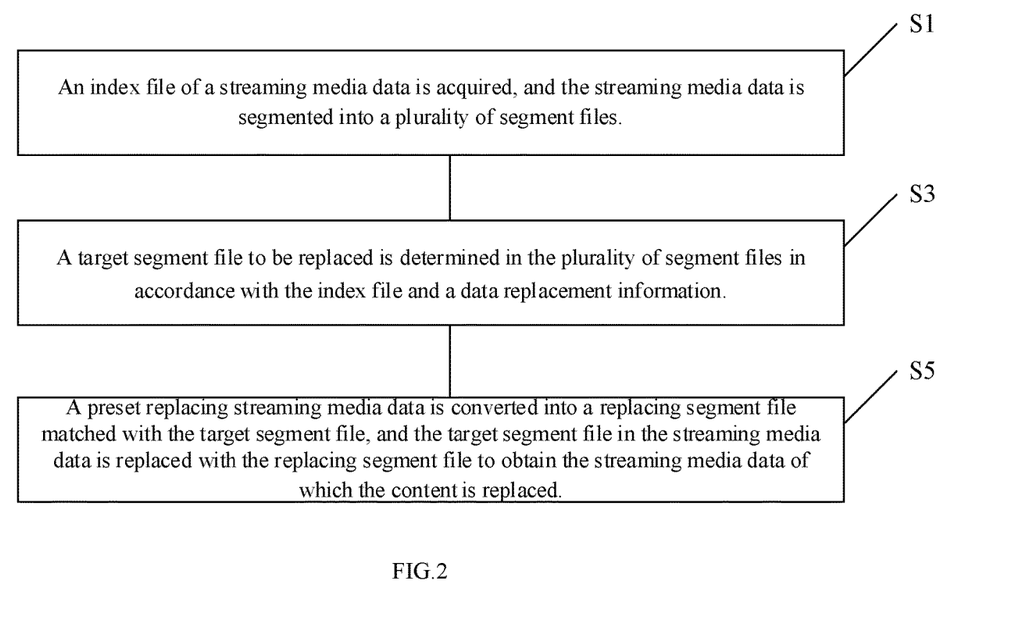
FIG. 2 is a flowchart of a method for processing streaming media data in an embodiment of the present disclosure.

With reference to FIG. 2, the method for processing streaming media data in the present disclosure may include the following steps.

In S1, an index file of streaming media data is acquired, and the streaming media data is segmented into a plurality of segment files.

In this embodiment, when a content of the streaming media data in a streaming media server is needed to be replaced, the server for processing streaming media may firstly obtain an index file of the streaming media data from the streaming media server, where the index file may be a file in an m3u8 format. In accordance with a HLS protocol, the streaming media data may be segmented into a plurality of segment files, and each segment file may adopt a is format. The index file may record segment information of each of the segment file. Specifically, the index file may record various items of information such as a play type of streaming media data (on demand or live broadcast), a maximum duration of each segment file, a file identifier of each segment file, an actual duration of each segment file, and the like. Here, each item of information starts with its own tag. For example, a tag indicating that a play type of the streaming media data is on demand may be EXT-X-END-LIST, a tag indicating the actual duration of each segment file may be EXTINF, and a tag indicating the maximum duration of each segment file may be EXT-X-TARGETDURATION. The above file identifier of the segment file may be a string used to indicate the segment file. For example, the file identifier may be the name of the segment file, or may be a background number assigned by the streaming media server when the segment file is stored in the streaming media server.

In S3, a target segment file to be replaced is determined in the plurality of segment files in accordance with the index file and information for replacing data.

In this embodiment, by parsing the index file of the streaming media data, a segment file list of the streaming media data may be constructed. In the segment file list, one or more of the file identifier, a start time node, a duration, and an end time node of each segment file may be recorded. In this way, the server for processing streaming media may determine the start time node and the end time node of each of the segment files by parsing the index file.

Figure 3:
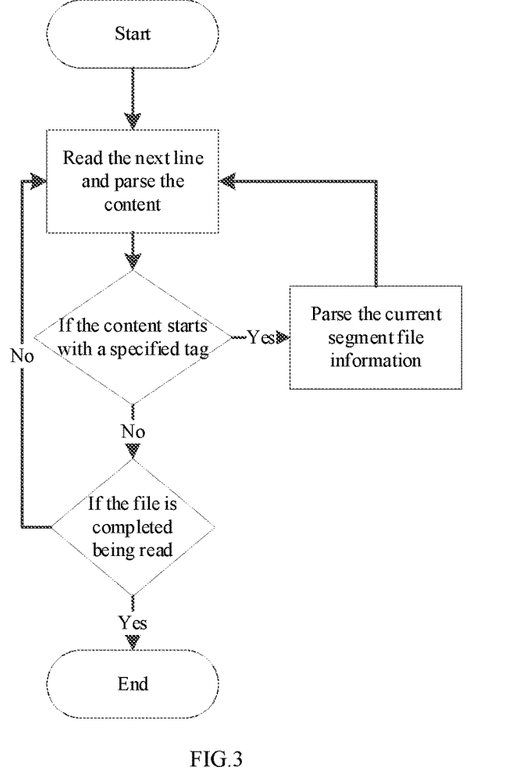
FIG. 3 is a schematic flow chart of parsing an index file in an embodiment of the present disclosure.

With reference to FIG. 3, in order to determine the start time node and the end time node of the each segment file, the server for processing streaming media may parse the information starting with the above EXTINF tag. Specifically, the streaming server may read content of the index file line by line. If a currently read content starts with a specified tag, the currently read content may be parsed. Here, the specified tag may be the tag used to indicate the actual duration of each segment file. For example, in a practical application example, a part of the contents of the index file may be as follows:

```
{
#EXTINF:10,
2000kbps-00003.ts
#EXTINF:10,
2000kbps-00004.ts
}
```

Here, the server for processing streaming media may parse the content starting with #EXTINF, thus determining that a duration of the current segment file is 10 seconds.

If the currently read content does not start with the specified tag, it indicates that the currently read content may not provide information about the play duration. Therefore, the currently read content may be directly skipped, and whether the content of the index file has been completed being read may be judged. If the reading is not completed, the content of a next line may be continuously read until the content of the index file has been completed being read.

In this way, the duration of each segment file may be parsed by the above line-by-line reading method. In this embodiment, the start time node and the end time node of each segment file may be parsed in accordance with the parsing result. Specifically, when the index file is started to be parsed, a global cumulative duration parameter may be set, and an initial value of the cumulative duration parameter may be 0. Then, when the server for processing streaming media reads the content of the current segment file in the index file, the current cumulative total duration in the cumulative duration parameter may be taken as the starting time node of the current segment file. For example, when the server for processing streaming media reads the content of a first segment file, a start time node of the first segment file may be 0. Then, after the content of the current segment file is parsed, the duration of the current segment file may be accumulated into the cumulative duration parameter. In this way, after the current cumulative total duration is taken as the start time node of the current segment file, the duration of the current segment file may be added to the total duration, and a result obtained may be taken as an end time node of the current segment file. For example, assuming that a duration of the first segment file is 10 seconds, an end time node of the first segment file may be 10 seconds.

In this way, the start time node and the end time node of each segment file may be determined by continuously updating values in the cumulative duration parameter.

In this embodiment, if there is content to be modified in the streaming media data, corresponding information for replacing data may be provided. The information for replacing data may be used to indicate a duration interval of the streaming media data to be replaced. In practical applications, the information for replacing data may include a start time node and a duration of the streaming media data to be replaced. In this way, the duration interval of the streaming media data to be replaced may be determined by the start time node to be replaced and the duration of the streaming media data to be replaced. For example, the duration interval of the streaming media data may be 1 minute and 10 seconds to 2 minutes and 20 seconds.

Figure 4:
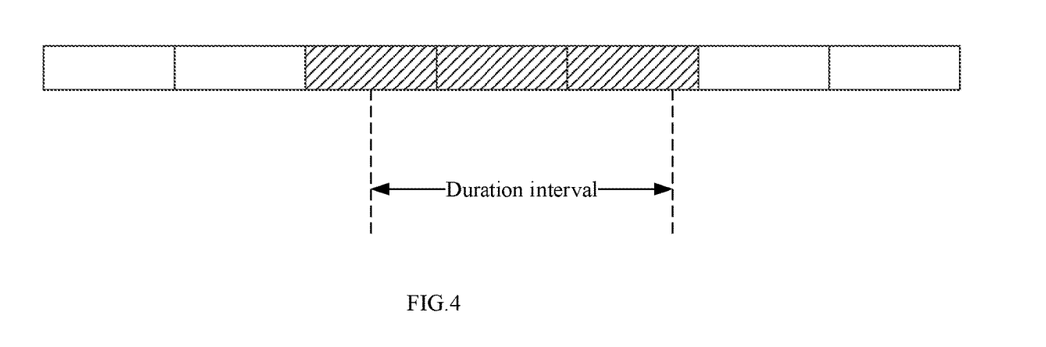
FIG. 4 is a schematic diagram of determining a target segment file in an embodiment of the present disclosure.

In this embodiment, in accordance with the information for replacing data and the index file above, the target segment file to be replaced may be determined in each segment file obtained by segmenting the streaming media data. Specifically, the start time node and the end time node of each segment file may be determined in accordance with the index file. If some content of a segment file falls within the above duration interval, the segment file may be taken as the target segment file to be replaced. As shown in FIG. 4, the server for processing streaming media may traverse each segment file. If the start time node or the end time node of the current segment file is located in the duration interval to be replaced, the current segment file may be taken as the target segment file to be replaced. For example, in FIG. 4, the three shadowed segment files may all be used as the target segment files to be replaced.

In S5, the preset replacing streaming media data is converted into replacing segment file matched with the target segment file, and the target segment file in the streaming media data is replaced with the replacing segment file to obtain the streaming media data of which the content is replaced.

In this embodiment, an uploader of the streaming media data may provide the replacing streaming media data for replacing the target segment file. Of course, in practical applications, the replacing streaming media data may further be a formatted streaming media data prepared by the streaming media server in advance. For example, a video picture indicated by the replacing streaming media data may be a picture with the words "This part of content is not displayed". In this way, after determining the target segment file to be replaced, the server for processing streaming media may read the preset replacing streaming media data, and after performing a series of processing on the replacing streaming media data, convert the replacing streaming media data into a replacing segment file matched with the target segment file.

Figure 5:
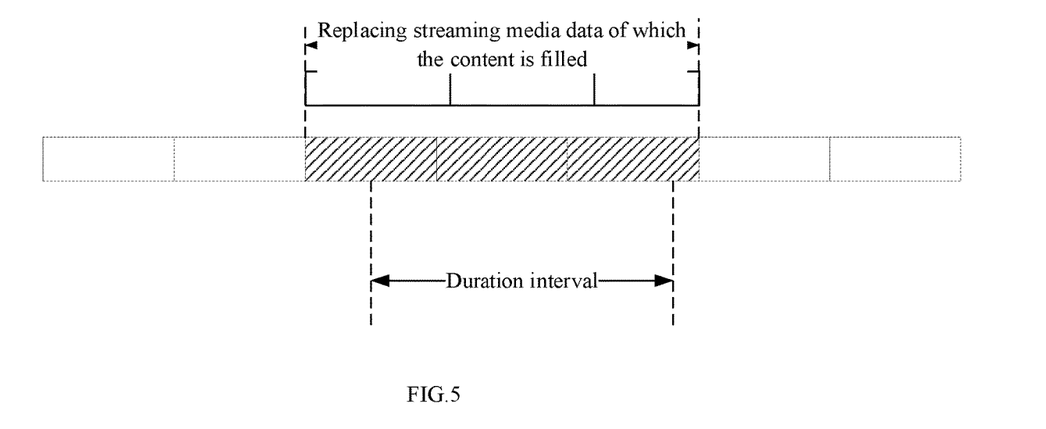
FIG. 5 is a schematic diagram of filling a replacing streaming media data in an embodiment of the present disclosure.

Considering that the preset duration of the replacing streaming media data may not be consistent with the duration of the target segment file to be replaced, in order to ensure that the index file does not change after the content is replaced, the duration of the replacing streaming media data is needed to be processed to be consistent with the duration of the target segment. Specifically, the duration occupied by the target segment file may be determined, and the determined duration is compared with the total duration of the replacing streaming media data. Here, the duration occupied by the target segment file may refer to a total duration of each target segment file to be replaced. With reference to FIG. 5, if the determined duration is greater than the total duration of the replacing streaming media data, it indicates that the duration of the replacing streaming media data is not sufficient. At this time, the content of the replacing streaming media data may be continuously filled following the replacing streaming media data, until the total duration of the replacing streaming media data of which the content is filled is consistent with the determined duration. For example, in FIG. 5, 1.5 times of the content of the replacing streaming media data following the original replacing streaming media data is needed to be filled, so that the duration of the replacing streaming media data of which the content is filled is consistent with the total duration of the target segment file. Then, the replacing streaming media data of which the content is filled may be taken as the preset replacing streaming media data.

Figure 6:
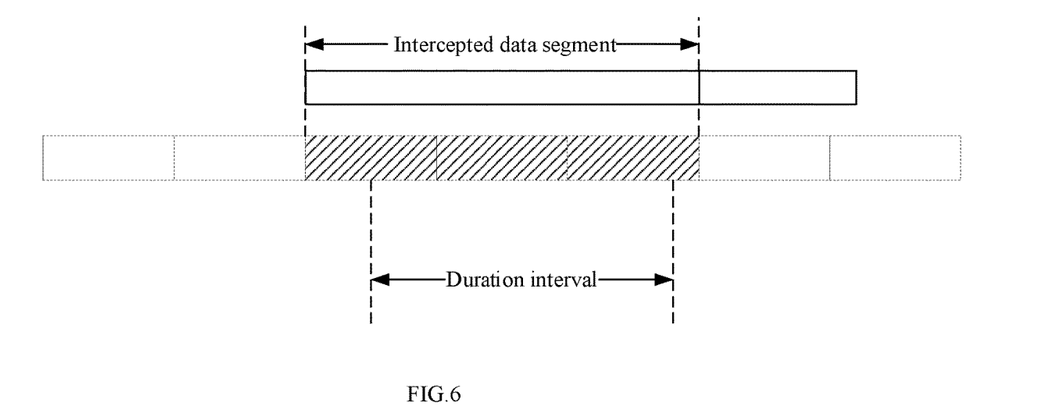
FIG. 6 is a schematic diagram of intercepting a replacing streaming media data in an embodiment of the present disclosure.

Further, with reference to FIG. 6, if the determined duration is less than the total duration of the replacing streaming media data, it indicates that the total duration of the replacing streaming media data is too long. Then, as shown in FIG. 6, a data segment of which the duration is consistent with the duration of the target segment file may be intercepted from the replacing streaming media data, and the intercepted data segment is taken as the above preset replacing streaming media data.

In this embodiment, after the above processing on a data length of the replacing streaming media data is performed, a streaming media attribute of the processed replacing streaming media data may be consistent with a streaming media attribute of the target segment file. The streaming media attribute may include various attributes such as an audio attribute, a video attribute, a program association table (PAT) information, and a program mapping table (PMT) information. Here, the video attribute includes at least one of a video encoding method, a video resolution, and a video frame rate, and the audio attribute includes at least one of an audio encoding method, an audio sampling rate, and the number of audio channels. Of course, in practical applications, the above audio attributes and video attributes may further include more or less content.

In this embodiment, the video attribute and the audio attribute of the preset replacing streaming media data may be respectively converted to be consistent with the video attribute and the audio attribute of the target segment file by video conversion tools such as ffmpeg. Further, the replacing streaming media data of which the video attribute and the audio attribute are converted may be performed a format conversion, thereby being converted into a stream file (ts file). When the format conversion is performed, the program association table information and the program mapping table information of the stream file are consistent with the program association table information and the program mapping table information of the target segment file. In this way, no matter what streaming media attribute the preset replacing streaming media data has, the streaming media attribute of the preset replacing streaming media data may be converted into the streaming media attribute matched with the streaming media data to be replaced through the technical solution in the application. Further, the same replacing stream media data may also be applied to the stream media data with different stream media attributes, thereby reducing a requirement for replacing stream media data, and further improving an efficiency of replacing the stream media data.

In this embodiment, the replacing streaming media data of which the duration is corrected and the attribute is converted may be segmented into the replacing segment files of which the number is matched with the number of the target segment files. Specifically, the number of the segmented replacing segment file not only matches the number of the target segment files, but also the start time nodes of the segmented replacing segment file corresponds to the start time nodes of the target segment files in a corresponding one-to-one relationship, so that the segmented replacing segment file perfectly replacing the target segment file.

In this embodiment, in order to ensure that the index file does not change, the replacing segment file needs to use a file identifier of the target segment file for storage. Specifically, the server for processing streaming media may read the file identifier of each of the target segment file from the index file, and assign the read file identifier to the corresponding replacing segment file respectively. In this way, replacing the target segment file in the streaming media data with the replacing segment file carrying the file identifier may ensure that the index file of the streaming media data does not change. For a client for playing streaming media, if the index file of streaming media data has been downloaded before, the replaced streaming media data may be played directly in accordance with the original index file without re-downloading the index file. In this way, the process for replacing the content of the streaming media data is imperceptible to the client for playing streaming media, thus there is no need to increase an overhead of the client for playing streaming media.

Figure 7:
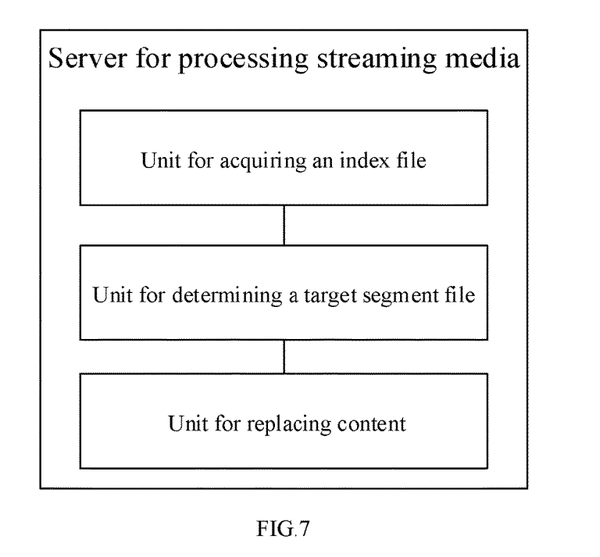
FIG. 7 is a schematic diagram of a function module of a server for processing streaming media in an embodiment of the present disclosure.

The present disclosure further provides a server for processing streaming media. With reference to FIG. 7, the server for processing streaming media includes:

a unit for acquiring an index file, configured to acquire an index file of a streaming media data, where the streaming media data is segmented into a plurality of segment files ;

a unit for determining a target segment file, configured to determine a target segment file to be replaced in the plurality of segment files in accordance with the index file and information for replacing data; and a unit for replacing content, configured to convert the preset replacing streaming media data into a replacing segment file matched with the target segment file, and replacing the target segment file in the streaming media data with the replacing segment file to obtain the streaming media data of which the content is replaced.

In one embodiment, the server for processing streaming media further includes:

a unit for parsing an attribute, configured to read each of the target segment files, and parse a streaming media attribute of the target segment file.

And the unit for replacing content is further configured to convert a streaming media attribute of the preset replacing streaming media data to enable the streaming media attribute of the preset replacing streaming media data to be consistent with the streaming media attribute of the target segment file, and segment the replacing streaming media data of which the attribute is converted into replacing segment files of which the number is matched with the number of the target segment files.

In one embodiment, the server for processing streaming media further includes:

a unit for comparing a duration, configured to determine a duration occupied by the target segment file and compare the determined duration with a total duration of the replacing streaming media data;

a cyclic completion unit configured to, if the determined duration is greater than the total duration of the replacing streaming media data, continue to fill the content of the replacing streaming media data following the replacing streaming media data until the total duration of the replacing streaming media data of which the content is filled is consistent with the determined duration, and take the replacing streaming media data of which the content is filled as the preset replacing streaming media data; and an intercepting unit configured to, if the determined duration is less than the total duration of the replacing streaming media data, intercept a data segment of which the duration is consistent with the determined duration from the replacing streaming media data, and take the intercepted data segment as the preset replacing streaming media data.

In one embodiment, the unit for replacing the content includes:

a module for converting an audio and video attribute, configured to convert the video attribute and the audio attribute of the preset replacing streaming media data to enable the video attribute and the audio attribute of the preset replacing streaming media data to be consistent with the video attribute and the audio attribute of the target segment file respectively, where the video attribute includes at least one of a video encoding method, a video resolution and a video frame rate, and the audio attribute includes at least one of an audio encoding method, an audio sampling rate and the number of audio channels; and a module for converting a stream file, configured to convert the replacing streaming media data of which the video attribute and the audio attribute are converted into a stream file, where the program association table information and the program mapping table information of the stream file is consistent with the program association table information and the program mapping table information of the target segment file.

In one embodiment, the unit for replacing the content includes:

a module for assigning a file identifier, configured to read a file identifier of the target segment file from the index file, and assign the read file identifier to the replacing segment file; and a replacing module configured to replace the target segment file in the streaming media data with the replacing segment file carrying the file identifier.

Figure 8:
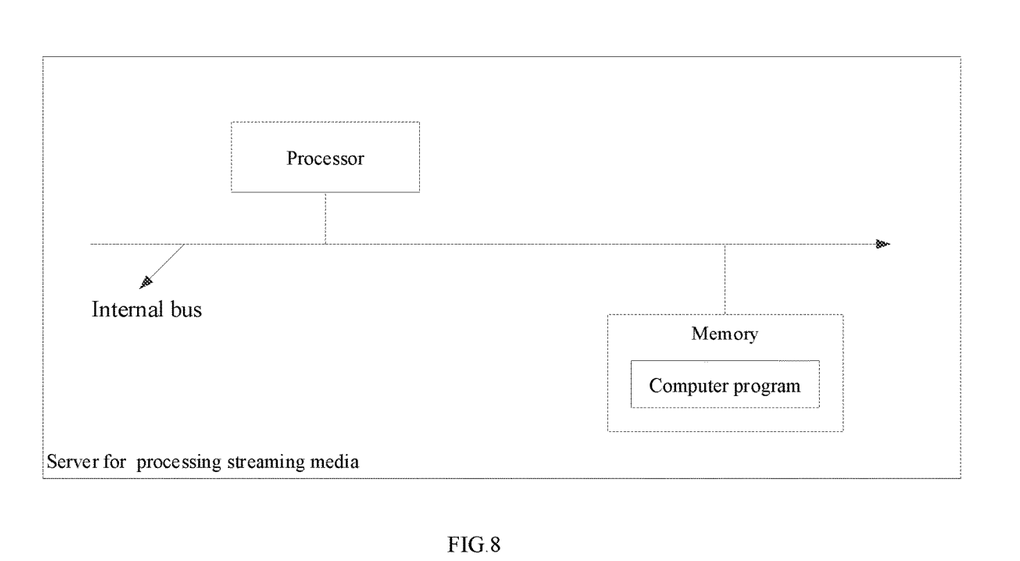
FIG. 8 is a schematic structural diagram of a server for processing streaming media in an embodiment of the present disclosure.

With reference to FIG. 8, the present disclosure further provides a server for processing streaming media which includes a processor and a memory, where the memory is configured to store a computer program, and the computer program is executed by the processor to implement the above method for processing streaming media data.

Figure 9:
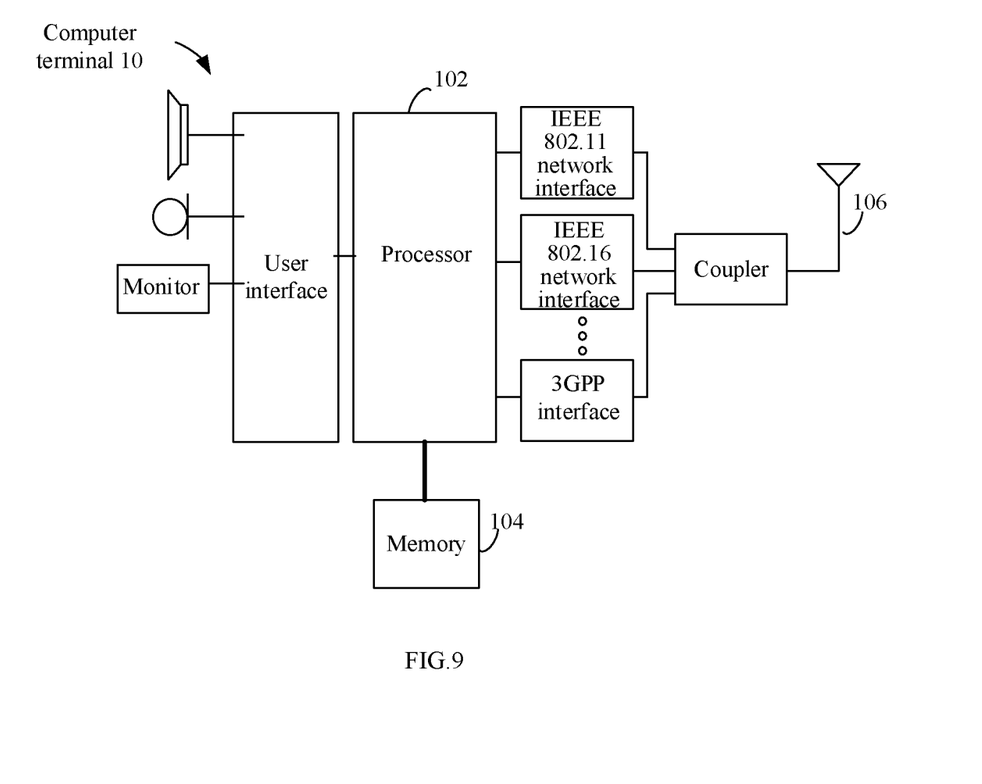
FIG. 9 is a schematic structural diagram of a computer terminal in an embodiment of the present disclosure.

With reference to FIG. 9, in the present disclosure, the technical solutions in the above embodiments may be applied to a computer terminal 10 shown in FIG. 9. The computer terminal 10 may include one or more (only one is shown in the figure) processors 102 (the processor 102 may include, but is not limited to, processing devices such as a microprocessor MCU or a programmable logic device FPGA), a memory 104 for storing data, and a transmission module 106 with communication functions. Those skilled in the art may understand that the structure shown in FIG. 9 is only schematic and does not constitute a limitation to the structure of the above electronic device. For example, the computer terminal 10 may further include more or fewer components than those shown in FIG. 9, or have a different configuration from that shown in FIG. 9.

The memory 104 may be configured to store software programs and modules of an application software, and the processor 102 executes various functional applications and data processing by running software programs and modules stored in the memory 104. The memory 104 may include a high-speed random access memory, and may further include a non-volatile memory such as one or more magnetic storage devices, flash memory, or other non-volatile solid-state memory. In some embodiments, the memory 104 includes memories remotely disposed with respect to the processor 102, the remote memories may be connected to the computer terminal 10 via a network. Examples of the above networks include, but are not limited to, the Internet, an intranet, a local area network, a mobile communication network, and combinations thereof.

The transmission device 106 is configured to receive or transmit data via one network. The above specific example of the network may include a wireless network provided by a communication provider of the computer terminal 10. In one example, the transmission device 106 includes a network interface controller (NIC), which may be connected to other network devices through a base station so as to communicate with the Internet. In one example, the transmission device 106 may be a radio frequency (RF) module, which is configured to communicate with the Internet wirelessly.

It is seen from the above-described that the technical solution in the present disclosure may complete a process of replacing the content of the streaming media data through the server for processing streaming media. Specifically, the server for processing streaming media may acquire an index file of the streaming media data of which the content is needed to be replaced. Then, in accordance with the information for replacing data and the index file, the target segment file to be replaced may be determined in the plurality of segment files obtained by segmenting the streaming media data. For these (or this) target segment files, corresponding replacing streaming media data may be provided. The server for processing streaming media may read the replacing streaming media data, then convert the replacing streaming media data into a replacing segment file matched with the target segment file, and replace the target segment file in the streaming media data with the replacing segment file, thereby obtaining the streaming media data of which the content is replaced. It is seen from the above-described that when the content of the streaming media data is replaced, not all the content of the entire streaming media data is needed to be replaced, but a part of the target segment file that is needed to be replaced may be determined in the streaming media data, and then the part of the target segment file may be replaced with a matching replacing segment file. In this way, in the streaming media server, the steps of re-segmenting the streaming media data and establishing index files of the entire streaming media data are not needed to be executed. Further, only the segment file in the streaming media data is replaced in the technical solution in the present disclosure, so that the index file of the streaming media data is not changed. In this way, the streaming media player may normally play the streaming media data of which the content is replaced using the original index file without re-downloading the index file. Therefore, the method for processing streaming media data and the server for processing streaming media in the present disclosure may save the overhead of the streaming media server and the streaming media player, and improve an efficiency of replacing the content.

Each embodiment in this specification is described in a progressive manner, and the same and similar parts between the embodiments may refer to each other. Each embodiment focuses on the differences from the other embodiments. In particular, the embodiments of the server may be explained with reference to the introduction of the embodiments of the above methods.

From the description of the above embodiments, those skilled in the art may clearly understand that each embodiment may be implemented by means of a software plus a necessary general hardware platform, and of course, may further be implemented by means of a hardware. Based on such understanding, the essence of the above technical solution or the part contributing to the existing technology may be embodied in the form of a software product. The computer software product may be stored in a computer readable storage medium such as a ROM/RAM, a magnetic disk, an optical disk, and the like, and includes several instructions to cause a computer device (which may be a personal computer, a server, or a network device, etc.) to execute the methods described in various embodiments or some parts of the embodiments.

The above-described description concerns only some embodiments of the present disclosure, and is not intended to limit the present disclosure. Any modifications, equivalent substitutions, improvements, and the like, made within the spirit and principles of the present disclosure are included in the scope of protection of the present disclosure.

What is claimed is:

1. A method for processing streaming media data, wherein the method comprises:
   acquiring an index file of the streaming media data, wherein the streaming media data are segmented into a plurality of segment files, and wherein the index file of the streaming media data includes file identifiers of respective ones of the plurality of segment files; determining at least one target segment file to be replaced in the plurality of segment files in accordance with the index file and information for replacing data; and
   converting preset replacing streaming media data into at least one replacing segment file matched with the at least one target segment file, and replacing the at least one target segment file in the streaming media data with the at least one replacing segment file to obtain streaming media data having replaced content;

the method further comprising: after determining the at least one target segment file to be replaced in the plurality of segment files:
reading each of the at least one target segment file; and parsing a streaming media attribute of the at least one target segment file;
wherein, correspondingly, converting the preset replacing streaming media data into the at least one replacing segment file matched with the at least one target segment file comprises:
converting a streaming media attribute of the preset replacing streaming media data to enable the streaming media attribute of the preset replacing streaming media data to be consistent with the streaming media attribute of the at least one target segment file; and
segmenting the preset replacing streaming media data into the at least one replacing segment file, a number of the at least one replacing segment file being matched with a number of the at least one target segment file.

2. The method in accordance with claim 1, wherein the information for replacing data is configured to indicate a duration interval of the streaming media data to be replaced;
correspondingly, the determining the at least one target segment file to be replaced in the plurality of segment files, in accordance with the index file and the information for replacing data comprises:
parsing the index file to determine a start time node and an end time node of each of the plurality of segment files; and
traversing each of the plurality of segment files, and taking a current segment file as the at least one target segment file to be replaced if the start time node or the end time node of the current segment file is located within the duration interval of the streaming media data to be replaced.

3. The method in accordance with claim 2, wherein the determining the start time node and the end time node of each of the plurality of segment files comprises:
taking a current cumulative total duration as a start time node of the current segment file when the content of the current segment file in the index file is read; and
adding a duration of the current segment file to the current cumulative total duration, and taking an acquired result as the end time node of the current segment file.

4. The method in accordance with claim 2, wherein the parsing the index file comprises:
reading content of the index file line by line, and parsing currently read content if the currently read content starts with a specified tag, wherein the specified tag is configured to indicate a duration of a respective segment file;
skipping the currently read content and judging whether reading of the content of the index file is completed if the currently read content does not start with the specified tag; and
if reading of the content is not completed, continuing to read a next line of the content of the index file until reading of the content of the index file is completed.

5. The method in accordance with claim 4, wherein the determining the start time node and the end time node of each of the plurality of segment files comprises:
taking a current cumulative total duration as a start time node of the current segment file when the content of the current segment file in the index file is read; and
adding a duration of the current segment file to the current cumulative total duration, and taking an acquired result as the end time node of the current segment file.

6. The method in accordance with claim 1, wherein the converting the streaming media attribute of the preset replacing streaming media data to be consistent with the streaming media attribute of the at least one target segment file comprises:
converting the video attribute and the audio attribute of the preset replacing streaming media data to enable the video attribute and the audio attribute of the preset replacing streaming media data to be consistent with the video attribute and the audio attribute of the at least one target segment file respectively, wherein the video attribute comprises at least one of a video encoding method, a video resolution and a video frame rate, and the audio attribute comprises at least one of an audio encoding method, an audio sampling rate and the number of audio channels; and
converting the replacing streaming media data of which the video attribute and the audio attribute is converted into a stream file, wherein program association table information and program mapping table information of the stream file is consistent with program association table information and program mapping table information of the at least one target segment file.

7. The method in accordance with claim 1, wherein before the converting the streaming media attribute of the preset replacing streaming media data to enable the streaming media attribute of the preset replacing streaming media data to be consistent with the streaming media attribute of the at least one target segment file, the method further comprises:
determining a duration occupied by the at least one target segment file, and comparing a determined duration with a total duration of the replacing streaming media data;
continuing to fill a content of the replacing streaming media data following the replacing streaming media data if the determined duration is greater than the total duration of the replacing streaming media data, until the total duration of the replacing streaming media data of which the content is filled is consistent with the determined duration, and taking the replacing streaming media data of which the content is filled as the preset replacing streaming media data; and
intercepting a data segment of which the duration is consistent with the determined duration from the replacing streaming media data if the determined duration is less than the total duration of the replacing streaming media data, and taking the intercepted data segment as the preset replacing streaming media data.

8. The method in accordance with claim 7, wherein the converting the streaming media attribute of the preset replacing streaming media data to be consistent with the streaming media attribute of the at least one target segment file comprises:
converting the video attribute and the audio attribute of the preset replacing streaming media data to enable the video attribute and the audio attribute of the preset replacing streaming media data to be consistent with the video attribute and the audio attribute of the at least one target segment file respectively, wherein the video attribute comprises at least one of a video encoding method, a video resolution and a video frame rate, and the audio attribute comprises at least one of an audio encoding method, an audio sampling rate and the number of audio channels; and converting the replacing streaming media data of which the video attribute and the audio attribute is converted into a stream file, wherein program association table information and program mapping table information of the stream file is consistent with program association table information and program mapping table information of the at least one target segment file.

9. The method in accordance with claim 1, further comprising: assigning at least one file identifier for the at least one target segment file in the index file to the at least one replacing segment file, whereby the at least one target segment file in the streaming media data is replaced without changing the index file of the streaming media data.

10. A server for processing streaming media, comprising a processor and a memory, wherein the memory is configured to store a computer program, and the computer program is executed by the processor to implement a method for processing streaming media data, wherein the method comprises:
acquiring an index file of the streaming media data, wherein the streaming media data are segmented into a plurality of segment files, and wherein the index file of the streaming media data includes file identifiers of respective ones of the plurality of segment files;
determining at least one target segment file to be replaced in the plurality of segment files in accordance with the index file and information for replacing data; and
converting preset replacing streaming media data into at least one replacing segment file matched with the at least one target segment file, and replacing the at least one target segment file in the streaming media data with the at least one replacing segment file to obtain streaming media data having replaced content;
the method further comprising: after determining the at least one target segment file to be replaced in the plurality of segment files:
reading each of the at least one target segment file; and
parsing a streaming media attribute of the at least one target segment file; wherein, correspondingly, converting the preset replacing streaming media data into the at least one replacing segment file matched with the at least one target segment file comprises:
converting a streaming media attribute of the preset replacing streaming media data to enable the streaming media attribute of the preset replacing streaming media data to be consistent with the streaming media attribute of the at least one target segment file; and
segmenting the preset replacing streaming media data into the at least one replacing segment file, a number of the at least one replacing segment file being matched with a number of the at least one target segment file.

11. The server for processing streaming media in accordance with claim 10, wherein the information for replacing data is configured to indicate a duration interval of the streaming media data to be replaced;
correspondingly, the determining the at least one target segment file to be replaced in the plurality of segment files, in accordance with the index file and the information for replacing data comprises:
parsing the index file to determine a start time node and an end time node of each of the plurality of segment files; and
traversing each of the plurality of segment files, and taking a current segment file as the at least one target segment file to be replaced if the start time node or the end time node of the current segment file is located within the duration interval of the streaming media data to be replaced.

12. The server for processing streaming media in accordance with claim 11, wherein the determining the start time node and the end time node of each of the plurality of segment files comprises:
taking a current cumulative total duration as a start time node of the current segment file when the content of the current segment file in the index file is read; and
adding a duration of the current segment file to the current cumulative total duration, and taking an acquired result as the end time node of the current segment file.

13. The server for processing streaming media in accordance with claim 11, wherein the parsing the index file comprises:
reading content of the index file line by line, and parsing currently read content if the currently read content starts with a specified tag, wherein the specified tag is configured to indicate a duration of a respective segment file; and
skipping the currently read content and judging whether reading of the content of the index file is completed if the currently read content does not start with the specified tag;
and if reading of the content of the index file is not completed, continuing to read a next line of the content of the index file until reading of the content of the index file is completed.

14. The server for processing streaming media in accordance with claim 13, wherein the determining the start time node and the end time node of each of the plurality of segment files comprises:
taking a current cumulative total duration as a start time node of the current segment file when the content of the current segment file in the index file is read; and
adding a duration of the current segment file to the current cumulative total duration, and taking an acquired result as the end time node of the current segment file.

15. The server for processing streaming media in accordance with claim 10, wherein the converting the streaming media attribute of the preset replacing streaming media data to be consistent with the streaming media attribute of the at least one target segment file comprises:
converting the video attribute and the audio attribute of the preset replacing streaming media data to enable the video attribute and the audio attribute of the preset replacing streaming media data to be consistent with the video attribute and the audio attribute of the at least one target segment file respectively, wherein the video attribute comprises at least one of a video encoding method, a video resolution and a video frame rate, and the audio attribute comprises at least one of an audio encoding method, an audio sampling rate and the number of audio channels; and
converting the replacing streaming media data of which the video attribute and the audio attribute is converted into a stream file, wherein program association table information and program mapping table information of the stream file is consistent with program association table information and program mapping table information of the at least one target segment file.

16. The server for processing streaming media in accordance with claim 10, wherein before the converting the streaming media attribute of the preset replacing streaming media data to enable the streaming media attribute of the preset replacing streaming media data to be consistent with the streaming media attribute of the at least one target segment file, the method further comprises:
  determining a duration occupied by the at least one target segment file, and comparing a determined duration with a total duration of the replacing streaming media data;
  continuing to fill a content of the replacing streaming media data following the replacing streaming media data if the determined duration is greater than the total duration of the replacing streaming media data, until the total duration of the replacing streaming media data of which the content is filled is consistent with the determined duration, and taking the replacing streaming media data of which the content is filled as the preset replacing streaming media data; and
  intercepting a data segment of which the duration is consistent with the determined duration from the replacing streaming media data if the determined duration is less than the total duration of the replacing streaming media data, and taking the intercepted data segment as the preset replacing streaming media data.

17. The server for processing streaming media in accordance with claim 16, wherein the converting the streaming media attribute of the preset replacing streaming media data to be consistent with the streaming media attribute of the at least one target segment file comprises:
  converting the video attribute and the audio attribute of the preset replacing streaming media data to enable the video attribute and the audio attribute of the preset replacing streaming media data to be consistent with the video attribute and the audio attribute of the at least one target segment file respectively, wherein the video attribute comprises at least one of a video encoding method, a video resolution and a video frame rate, and the audio attribute comprises at least one of an audio encoding method, an audio sampling rate and the number of audio channels; and
  converting the replacing streaming media data of which the video attribute and the audio attribute is converted into a stream file, wherein program association table information and program mapping table information of the stream file is consistent with program association table information and program mapping table information of the at least one target segment file.

18. The server for processing streaming media in accordance with claim 10, wherein the method further comprises:
  assigning at least one file identifier for the at least one target segment file in the index file to the at least one replacing segment file, whereby the at least one target segment file in the streaming media data is replaced without changing the index file of the streaming media data.

* * * * *